(12) United States Patent
Manesh et al.

(10) Patent No.: US 12,003,031 B2
(45) Date of Patent: Jun. 4, 2024

(54) DUAL-POLARIZED MICROSTRIP PATCH ANTENNA AND ARRAY

(71) Applicant: The Board of Regents of the University of Oklahoma, Norman, OK (US)

(72) Inventors: Hadi Saeidi Manesh, Norman, OK (US); Guifu Zhang, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 826 days.

(21) Appl. No.: 17/094,421

(22) Filed: Nov. 10, 2020

(65) Prior Publication Data
US 2021/0159610 A1 May 27, 2021

Related U.S. Application Data

(60) Provisional application No. 62/938,741, filed on Nov. 21, 2019.

(51) Int. Cl.
| | |
|---|---|
| *H01Q 21/24* | (2006.01) |
| *G01S 7/02* | (2006.01) |
| *G01S 13/95* | (2006.01) |
| *H01Q 1/48* | (2006.01) |
| *H01Q 19/00* | (2006.01) |
| *H01Q 21/00* | (2006.01) |

(52) U.S. Cl.
CPC .............. *H01Q 21/24* (2013.01); *G01S 7/025* (2013.01); *H01Q 1/48* (2013.01); *H01Q 19/005* (2013.01); *H01Q 21/0025* (2013.01); *G01S 13/95* (2013.01)

(58) Field of Classification Search
CPC .. H01Q 21/24; H01Q 21/0025; H01Q 21/065; G01S 7/025; G01S 13/95; G01S 13/951
See application file for complete search history.

(56) References Cited

U.S. PATENT DOCUMENTS

| | | | |
|---|---|---|---|
| 2019/0207314 A1* | 7/2019 | Oladeinde | H01Q 9/045 |
| 2021/0118828 A1* | 4/2021 | Franson | H01Q 3/26 |

FOREIGN PATENT DOCUMENTS

WO    2020156650 A1    8/2020

* cited by examiner

*Primary Examiner* — Marc Anthony Armand
(74) *Attorney, Agent, or Firm* — Conley Rose, P.C.; Grant Rodolph; Jonathan K. Polk

(57) ABSTRACT

A microstrip patch antenna comprising: a unit cell comprising: a plurality of layers comprising: a first laminate comprising one or more horizontal polarization feed lines and one or more vertical polarization feed lines, a second laminate comprising a radiating square patch, and a third laminate comprising a parasitic patch; and a ground plane comprising one or more polarization slots. A differential feed antenna comprising: a balun; a plurality of feed lines; and one or more polarization ports configured to excite at a plurality of locations.

22 Claims, 20 Drawing Sheets

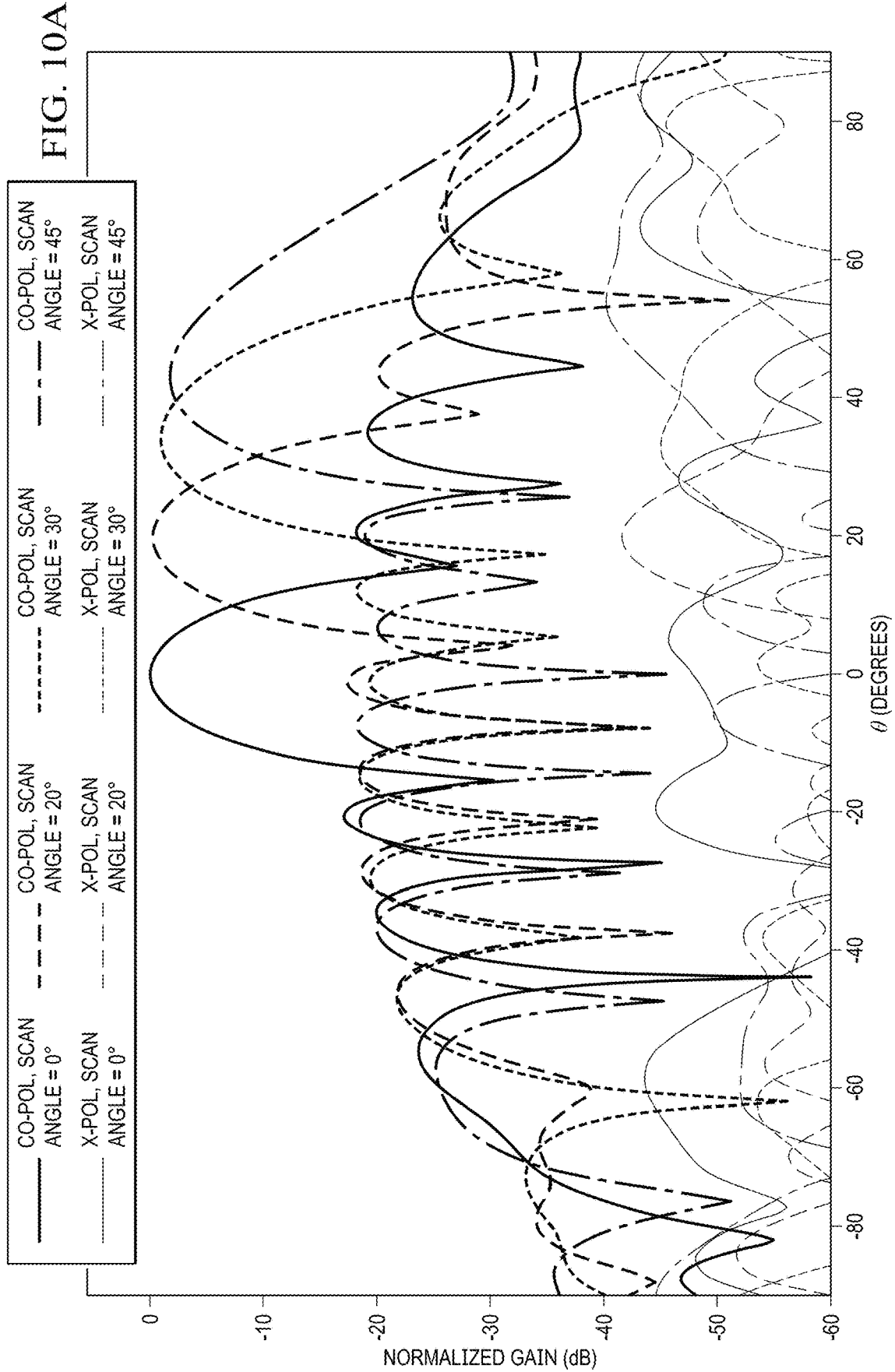

DUAL-POLARIZED MICROSTRIP PATCH ANTENNA AND ARRAY

CROSS-REFERENCE TO RELATED APPLICATIONS

This patent claims priority to U.S. Prov. Patent App. No. 62/938,741 filed on Nov. 21, 2019, which is incorporated by reference.

STATEMENT REGARDING FEDERALLY SPONSORED RESEARCH OR DEVELOPMENT

This invention was supported by the National Oceanic and Atmospheric Administration under Grant NA11OAR4320072 and Grant NA16OAR4320115. The government has certain rights in this invention.

BACKGROUND

There is an interest, and practical value, in utilizing polarization diversity for a radar to obtain increased target information or for a communication system to carry additional signal information without occupying more frequency band. This is because frequency bands are getting crowded in microwave frequencies due to the recent advancement in cellular communications. For example, SENSR has been started to study the feasibility of replacing the four radar networks that service the United States with a single network of MPARs.

Candidates being considered for future MPARs include CPPAR and PPPAR. To have desired accurate weather measurements with a PPPAR or CPPAR, a high-performance phased array antenna with dual-polarization capability is required. The array antenna is required to possess matched main beams, high input-isolation, and low cross-polarization level at broadside and scan angles up to 45°. The beam mismatch should be within 5% of the beamwidth, the input isolation needs to be better than 40 dB, and the cross-polarization level needs to be lower than −20 dB and −40 dB for alternate and simultaneous transmission, respectively. These are very stringent requirements for antenna design and development.

Numerous methods have been previously proposed for improving the antenna pattern and increasing the isolation between array elements. However, the currently available designs lack polarization purity of the antenna radiation pattern.

The antenna performance and the accuracy of weather measurement could be affected by radome conditions (e.g., wet radome), and several investigations have been conducted to illustrate these effects on antenna radiation pattern and the polarimetric biases.

Achieving a dual-polarization antenna with high polarization purity has been a challenge. The novel antenna configurations of the present disclosure address the deficiencies of the previously proposed antenna designs.

BRIEF DESCRIPTION OF THE DRAWINGS

Several embodiments of the present disclosure are hereby illustrated in the appended drawings. It is to be noted however, that the appended drawings only illustrate several embodiments and are therefore not intended to be considered limiting of the scope of the present disclosure.

FIG. 10A shows the measured scan radiation pattern for H-pol and $\varphi=0°$.

DETAILED DESCRIPTION

Figure 1:
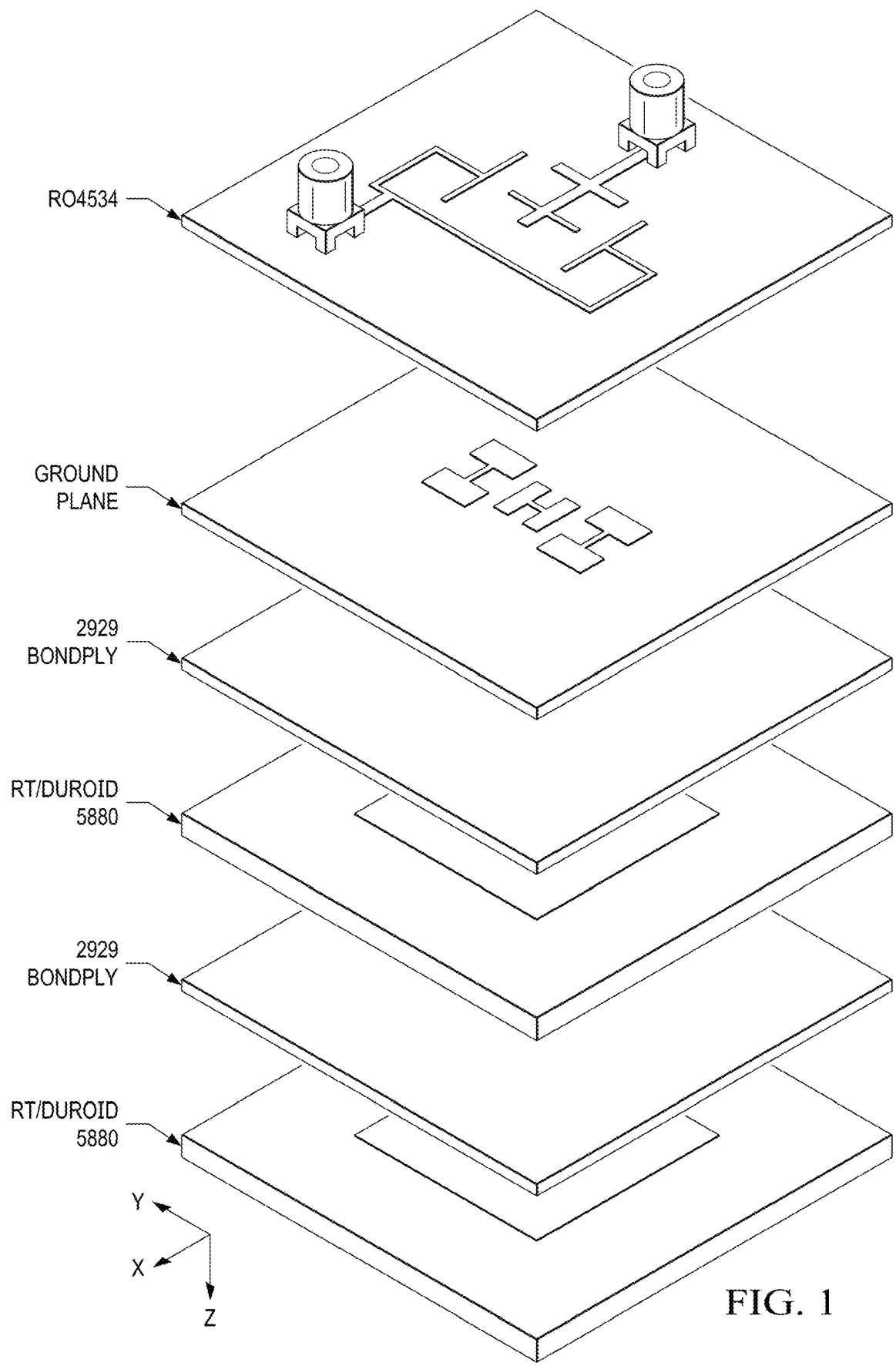
FIG. 1 is a schematic showing a layer stack up of a unit cell constructed in accordance with the present disclosure.
Figure 2A:
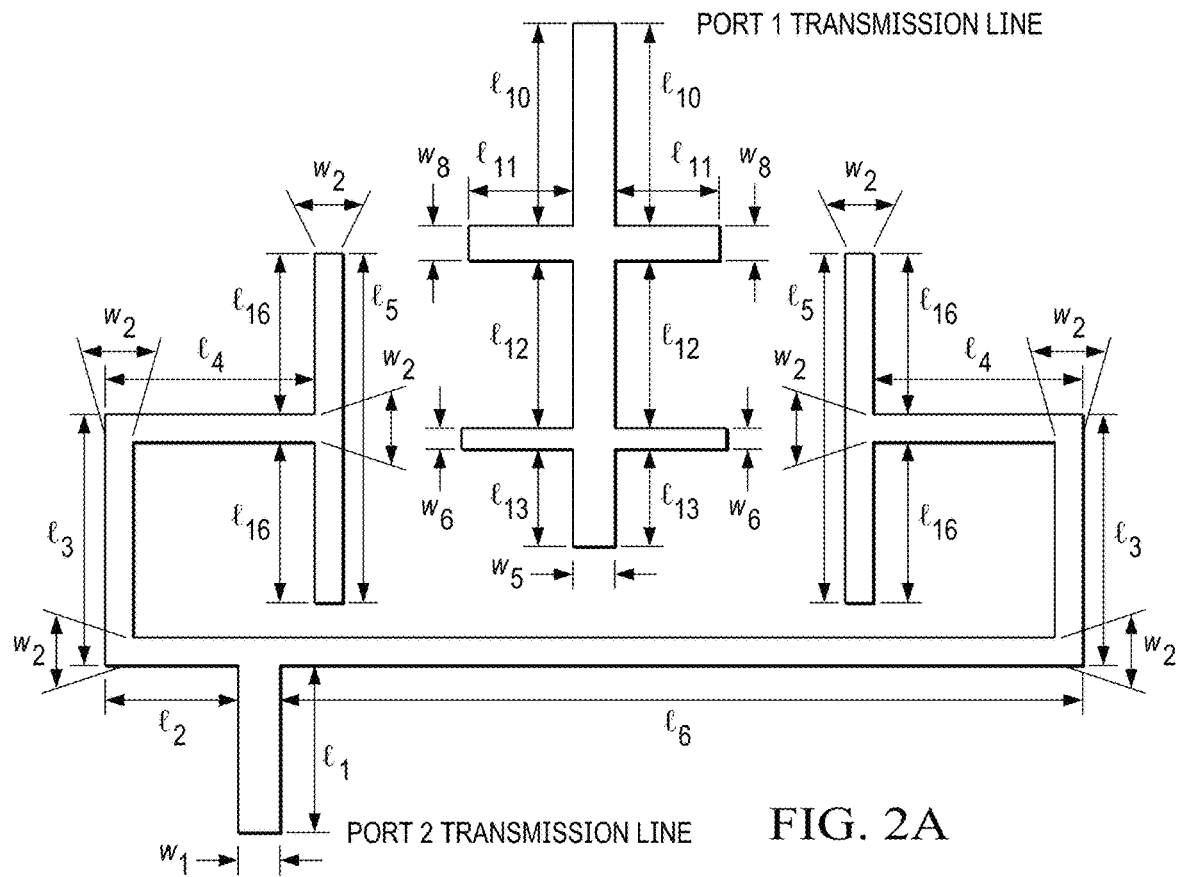
FIG. 2A shows Layer 1—design parameters for port 1 and port 2 transmission lines.
Figure 2B:
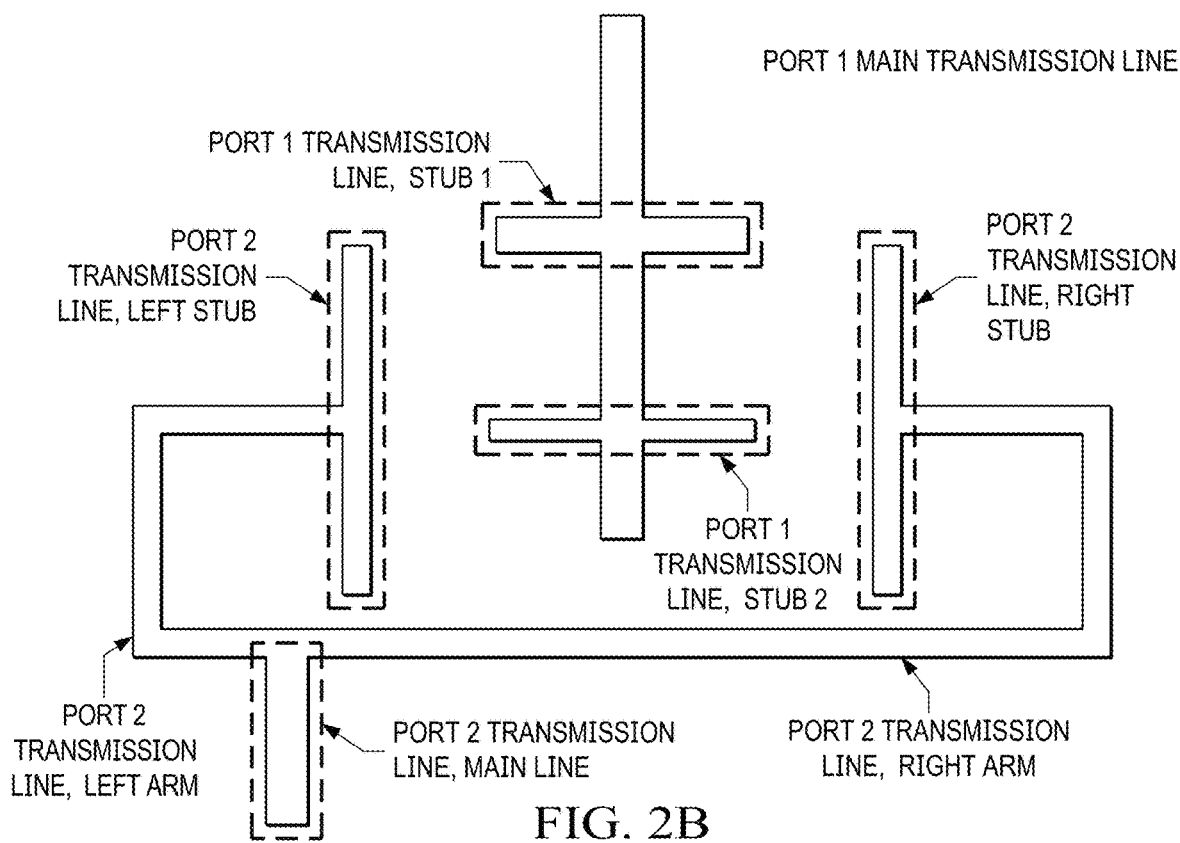
FIG. 2B shows Layer 1—port 1 and port 2 transmission lines.
Figure 2C:
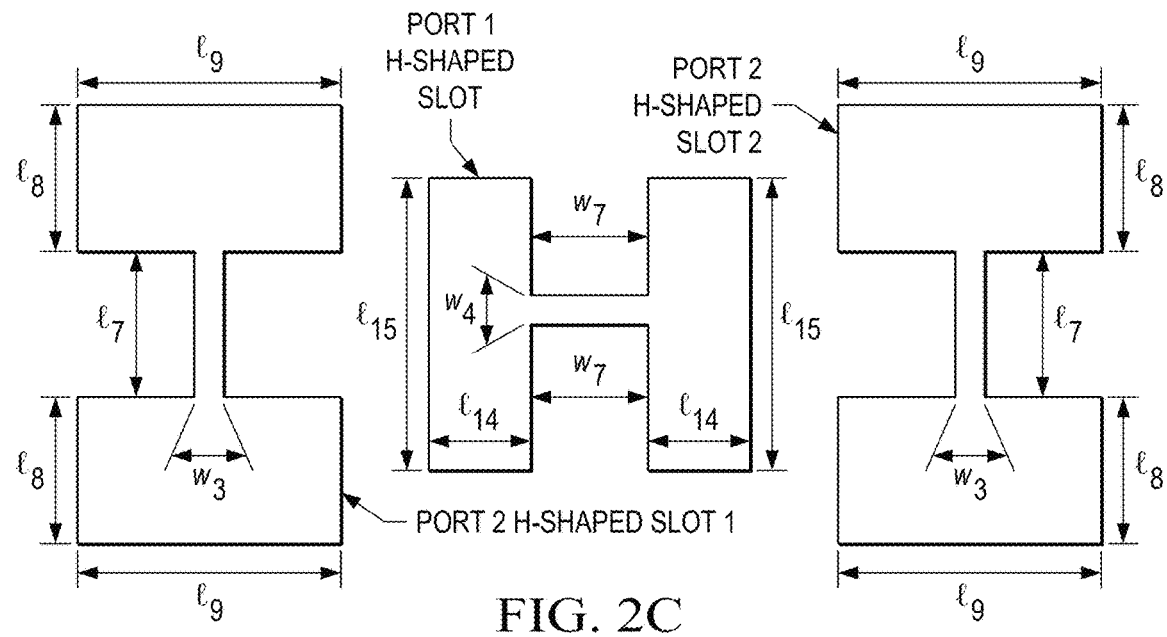
FIG. 2C shows Layer 2—slots on the ground plane.
Figure 2D:
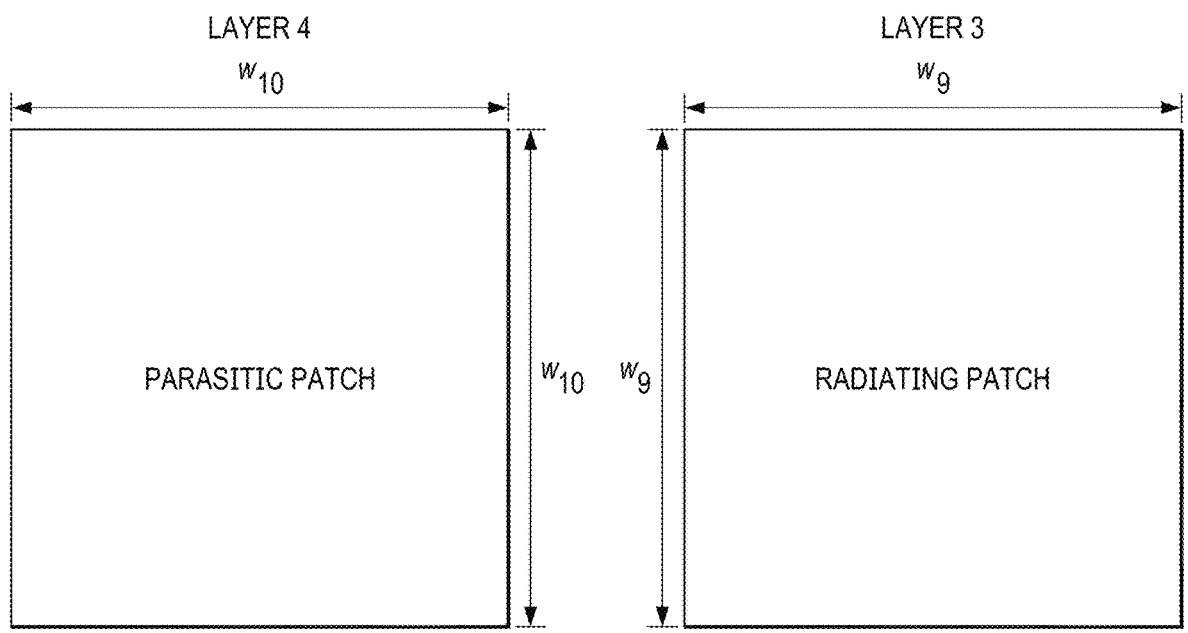
FIG. 2D shows Layer 3—the radiating patch and Layer 4—the parasitic patch.

The present disclosure is directed to the design and development of a high-performance, dual-polarization, hybrid-aperture-coupled microstrip patch antenna and arrays of such antennas. The microstrip patch antenna achieves the required antenna performance and has the added benefits of a low profile and low fabrication costs. Also, other microwave components, such as filters, can be readily integrated into this antenna array structure. The present disclosure describes different methods for exciting two orthogonal polarizations using microstrip patch antennas. Dual-polarized hybrid feed antennas with high polarization purity could be an ideal choice for MPAR applications. One of the advantages of using a hybrid feed technique to excite the single element is increasing the geometrical symmetry of the antenna without having a complicated multilayer design. Although the coupling between two polarizations and cross-polarization of the antennas excited with this method are very low, this type of patch antenna has a very compact design.

Before describing various embodiments of the present disclosure in more detail by way of exemplary description, examples, and results, it is to be understood that the present disclosure is not limited in application to the details of methods and compositions as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and compositions of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example. A reference to degrees such as 1 to 90 is intended to explicitly include all degrees in the range.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" and "approximately" are used to indicate that a value includes the inherent variation of error. Further, in this detailed description, each numerical value (e.g., temperature or time) should be read once as modified by the term "about" (unless already expressly so modified), and then read again as not so modified unless otherwise indicated in context. As noted, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. The use of the term "about" may mean a range including ±10% of the subsequent number unless otherwise stated.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., length).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein any reference to "we" as a pronoun herein refers generally to laboratory personnel or other contributors who assisted in the laboratory procedures and data collection and is not intended to represent an inventorship role by said laboratory personnel or other contributors in any subject matter disclosed herein.

The following abbreviations apply:
ABS: acrylonitrile butadiene styrene
ASR: airport surveillance radar
AUT: antenna under test
CPPAR: cylindrical polarimetric phased array radar
dB: decibel(s)
E-plane: electric field plane
GHz: gigahertz
H: horizontal
HFSS: high-frequency structure simulator
H-plane: magnetic field plane
m: meter(s)
mm: millimeter(s)
MPAR: multi-function phased array radar
PPPAR: planar polarimetric phased array radar
PTFE: polytetrafluoroethylene
SENSR: Spectrum Efficient National Surveillance Radar Program
TDWR: terminal doppler weather radar
UEAEP: unit excitation active element pattern
V: vertical
3D: three-dimensional
°: degree(s).

Returning to the detailed description, in one non-limiting embodiment of the antenna, a dual-polarized microstrip patch antenna array is designed for multifunction radar application. A higher than 51 dB horizontal to vertical ports isolation and a better than −30 dB cross-polarization level is achieved from the fabricated single element measurements. To improve the cross-polarization level, a 2×2-element subarray, which is configured according to the image feed method, is designed and fabricated, and a better than −39 dB cross-polarization level is observed from the measurements results. The return loss and coupling between horizontal and vertical ports are simulated using periodic boundary conditions in CST Microwave Studio. The simulation results showed that the return loss of H and V ports stay below −10 dB while scanning up to 45°, and a less than −45 dB H to V port coupling is achieved at a 45° scan angle. Using a UEAEP method, the 4×10-element array antenna radiation pattern is measured at 4 different scan angles and in the main beam area. Better than −45 dB cross-polarization level is achieved with H-pol and V-pol excitations in both principal planes while scanning up 45°.

EXAMPLES

The disclosed concepts will now be discussed in terms of several specific, non-limiting examples. The examples described below, which include particular embodiments, will serve to illustrate the practice of the present disclosure, it being understood that the particulars shown are by way of example and for purposes of illustrative discussion of particular embodiments of the present disclosure only and are presented in the cause of providing what is believed to be a useful and readily understood description of construction procedures as well as of the principles and conceptual aspects of the inventive concepts.

Example 1: Single Element Design

The layer stack-up and the design parameters of the proposed unit cell are presented in FIG. 1 and FIGS. 2A-2D. On the front side of the first laminate, the feed lines for both horizontal and vertical polarizations are laid. To achieve the maximum bandwidth and to have the minimum surface wave effect, it is always desired to implement a material with low dielectric constant. However, using materials with a low relative permittivity will increase the unit cell dimensions. Also, since materials with low relative permittivity, for instance, RT/duroid 5880, are based on PTFE composites, special treatment for metalized holes is required. In this design, an RO4534 laminate with the relative permittivity of 3.4 and a thickness of 0.813 mm is chosen for the first substrate, which contains feed lines and metalized holes for connectors. The ground plane, which includes three slots, is located on the back side of the RO4534 laminate. The radiating and parasitic patches are located on the back side of the second and third laminates, which are 3.175 mm thick RT/duroid 5880. In the proposed design, a low dielectric material, RT/duroid 5880, is used to achieve the required bandwidth for multifunction applications, and RO453 with the higher dielectric material is used for reducing the size of the transmission lines and ease of fabrication.

As seen in FIGS. 2A-2D, the horizontal polarization feed line and the corresponding H-shaped slot are placed in the middle of the antenna. The horizontal polarization slot is symmetric with respect to horizontal and vertical planes, and it is positioned in the middle of the ground plane.

Exemplary, non-limiting, values for the various length and width parameters shown in the embodiments of FIG. 2A-2D are shown in Tables 1-3. Each parameter value may be varied by plus/minus 0.001% to 500%, for example.

TABLE 1

Exemplary antenna parameter values

| Parameter | Value (mm) | Value/Wavelength ($\lambda$) |
|---|---|---|
| $l_1$ | 7.9 | 0.07373 |
| $l_2$ | 5.65 | 0.05273 |
| $l_3$ | 11.45 | 0.10687 |
| $l_4$ | 8.85 | 0.0826 |
| $l_5$ | 14.7 | 0.1372 |
| $l_6$ | 29.85 | 0.2786 |
| $l_7$ | 4.6 | 0.04293 |
| $l_8$ | 4.2 | 0.0392 |
| $l_9$ | 7.4 | 0.06907 |
| $l_{10}$ | 9.5 | 0.08867 |

TABLE 2

Exemplary antenna parameter values

| Parameter | Value (mm) | Value/Wavelength ($\lambda$) |
|---|---|---|
| $w_1$ | 1.7 | 0.0159 |
| $w_2$ | 0.95 | 0.0089 |
| $w_3$ | 0.76 | 0.0071 |
| $w_4$ | 0.6 | 0.0056 |
| $w_5$ | 1.8 | 0.0168 |
| $w_6$ | 0.9 | 0.0084 |
| $w_7$ | 3.1 | 0.0289 |

TABLE 2-continued

Exemplary antenna parameter values

| Parameter | Value (mm) | Value/Wavelength (λ) |
|---|---|---|
| $w_8$ | 1.5 | 0.014 |
| $w_9$ | 27.7 | 0.2585 |
| $w_{10}$ | 28.9 | 0.2697 |

TABLE 3

Exemplary antenna parameter values

| Parameter | Value (mm) | Value/Wavelength (λ) |
|---|---|---|
| $l_{11}$ | 4.5 | 0.042 |
| $l_{12}$ | 7 | 0.06533 |
| $l_{13}$ | 4 | 0.03733 |
| $l_{14}$ | 2.7 | 0.0252 |
| $l_{15}$ | 8.4 | 0.0784 |
| $l_{16}$ | 6.875 | 0.06417 |
| $h_{sub1}$ | 0.813 | 0.00759 |
| $h_{sub2}$ | 3.175 | 0.02963 |
| $h_{sub3}$ | 3.175 | 0.02963 |
| $h_{bondply}$ | 0.076 | 0.00071 |

Antenna Design

One aspect of the design and development of the low cross-polarization and high-isolation patch antennas is to increase the symmetry of design. As mentioned above, the horizontal polarization slot is designed to be in the middle of the ground plane. Therefore, the only way to maintain the symmetry of the design without having a complicated multilayer design is to excite the vertical polarization through a differential feed method. To implement the differential feeding method, two similar H-shaped slots are placed beside the horizontal polarization slot. In the presented differential feed method, to suppress the higher-order modes and reduce the cross-polarization level, the two slots are excited with a 180° phase shift. As seen in FIG. 1, the required 180° phase shift for the differential feed method is produced through the length difference of the two branches of the vertical polarization excitation feed line.

The typical bandwidth of a microstrip patch antennas is 3% percent. One way to increase the bandwidth in the microstrip patch antenna is to increase the substrate thickness or to use the stacked patch method. Increasing the overall thickness of the microstrip patch antenna will result in the excitation of higher-order modes. Higher-order modes increase the coupling between the orthogonal polarizations and degrade the cross-polarization level, especially the dual linear polarized microstrip patch antennas.

Figure 3:
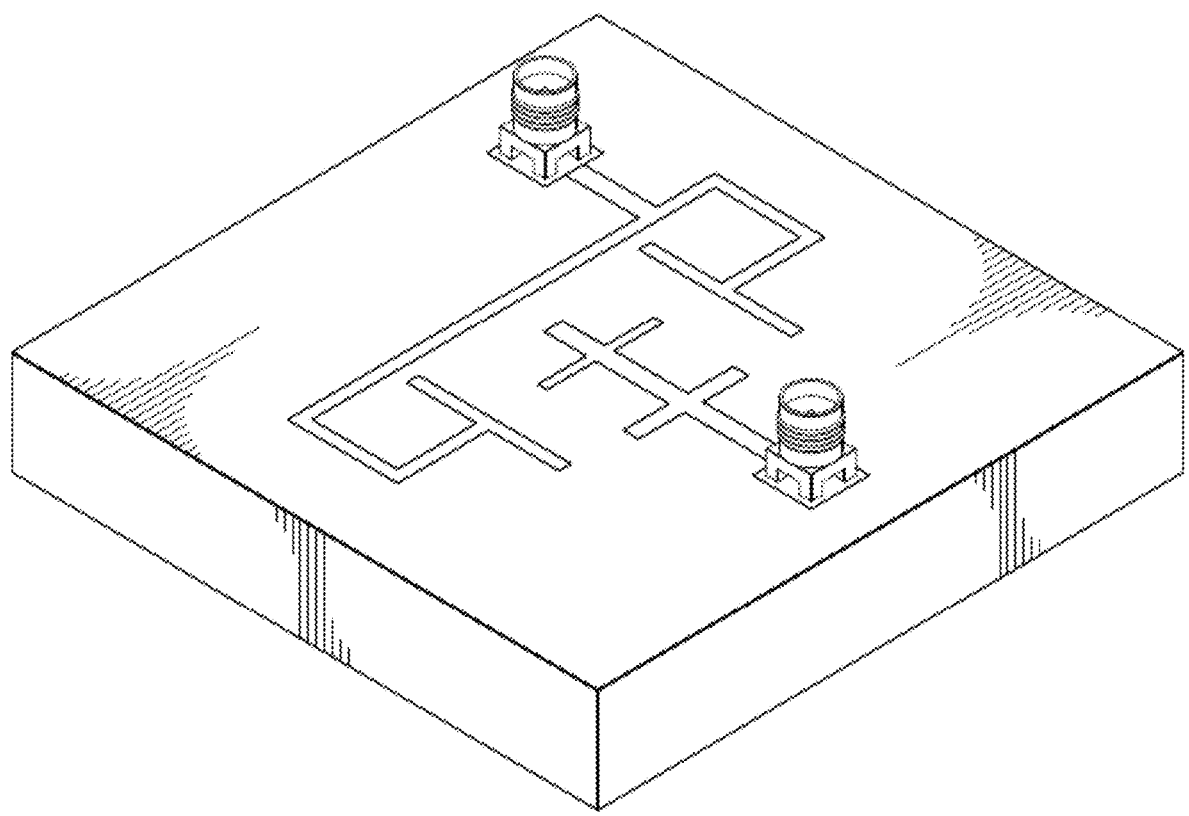
FIG. 3 is a photograph of a perspective view of a fabricated unit cell.
Figure 4:
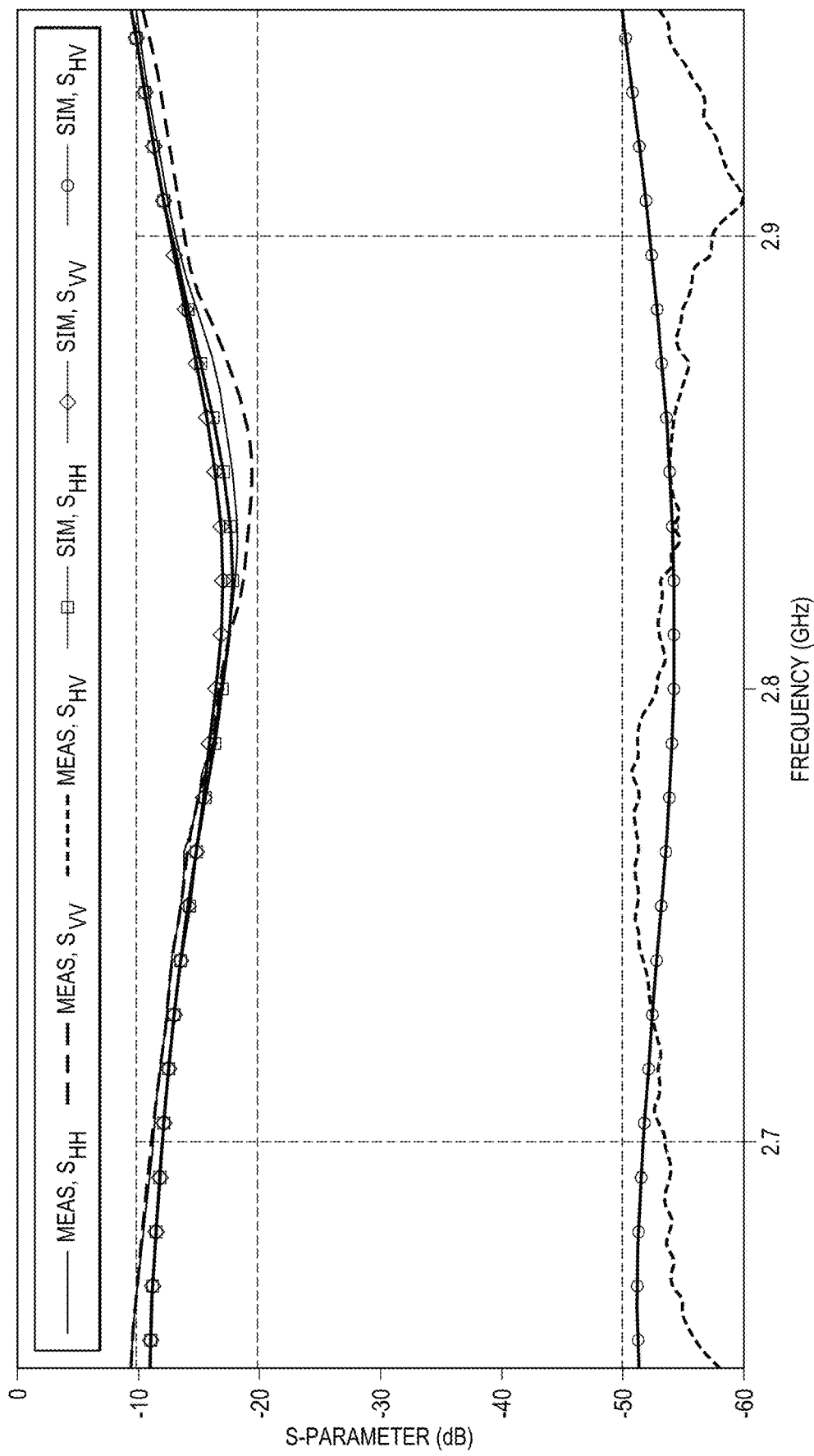
FIG. 4 shows the simulated and measured S-parameters of the disclosed antenna.

The allocated bandwidth for MPAR operation when replacing ASR and TDWR is 2.7-2.9 GHz. The multilayer configuration bandwidth enhancement method is implemented in this design. In one non-limiting embodiment, a parasitic patch is placed on top of the radiating square patch. For bonding three different laminates, an adhesive material such as 0.076 mm thick Rogers 2929 Bondply may be utilized. The photograph of the fabricated unit cell is shown in FIG. 3 and provides the simulated and measured S-parameters. FIG. 4 demonstrates agreement between the simulation and measurement results.

Single Element Methods and Results

The S-parameters of the proposed single element are measured by using an N5225A network analyzer from Agilent Technologies.

Step 1: The network analyzer and attached cables are calibrated using the ECal module.

Step 2: After calibration, the S-parameters were measured in a small anechoic chamber to ensure that interference of unwanted radiation and reflection are minimized.

Step 3: The measured S-parameters are then exported and plotted along with the simulation results.

For horizontal and vertical polarizations, below a −12.1 dB return loss has been achieved from simulated and measured results in the entire bandwidth (2.7-2.9 GHz). Also, the horizontal and vertical polarization return loss results are similar, which decreases the gain mismatch between the two polarizations. As seen in FIG. 4, the isolation between polarizations is better than 52 dB. To measure such low coupling between ports, the S-parameter measurements are conducted in shielded anechoic chambers designed for S-parameter measurements. As seen in FIG. 4, we managed to measure a higher than 51 dB input isolation in the entire bandwidth.

Figure 5:
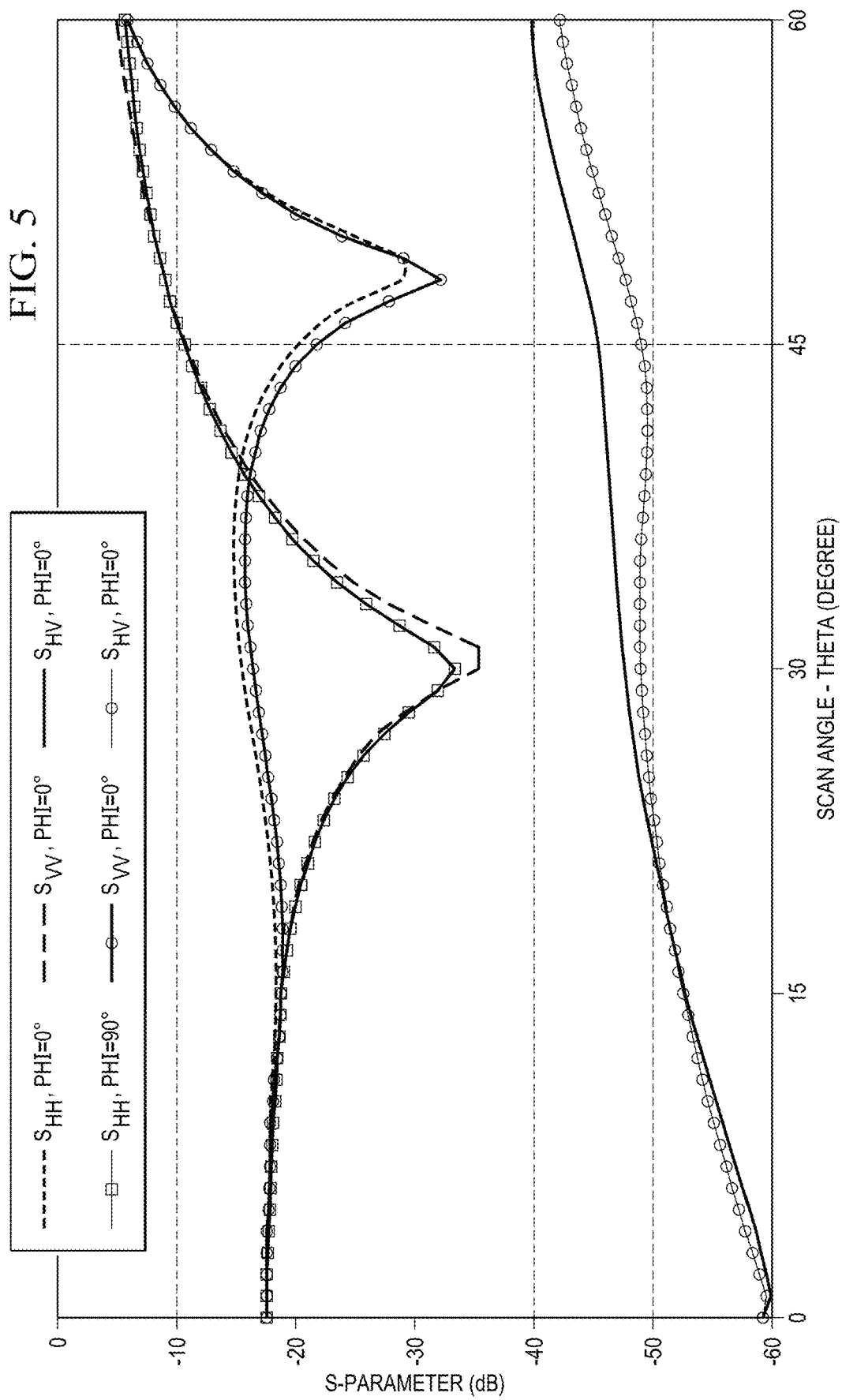
FIG. 5 shows the simulated active S-parameters of the disclosed patch antenna under periodic boundary conditions.

FIG. 5 shows the S-parameters versus scan angles in $\varphi=0°$ and $\varphi=90°$ planes. As seen in FIG. 5, at the MPAR operating frequency, the simulated return loss results stay below −10 dB while scanning up to 45° in both principal planes. The isolation between two orthogonal polarizations in the required scanning range is better than 45 dB.

The single element radiation pattern is measured in a far-field anechoic chamber.

Step 1: The single element has been precisely aligned with the standard measurement probe.

Step 2: Horizontal polarization radiation patterns are measured while the vertical polarization was terminated. The co-polarization and cross-polarization patterns have been measured by changing the polarization of the measurement probe. The radiation patterns of the single element in $\varphi=0°$ and $\varphi=90°$ have been measured by rotating the single element 90°.

Step 3: Vertical polarization radiation patterns are measured while the horizontal polarization was terminated. The co-polarization and cross-polarization patterns have been measured by changing the polarization of the measurement probe. The radiation patterns of the single element in $\varphi=0°$ and $\varphi=90°$ have been measured by rotating the single element 90°.

Figure 6A:
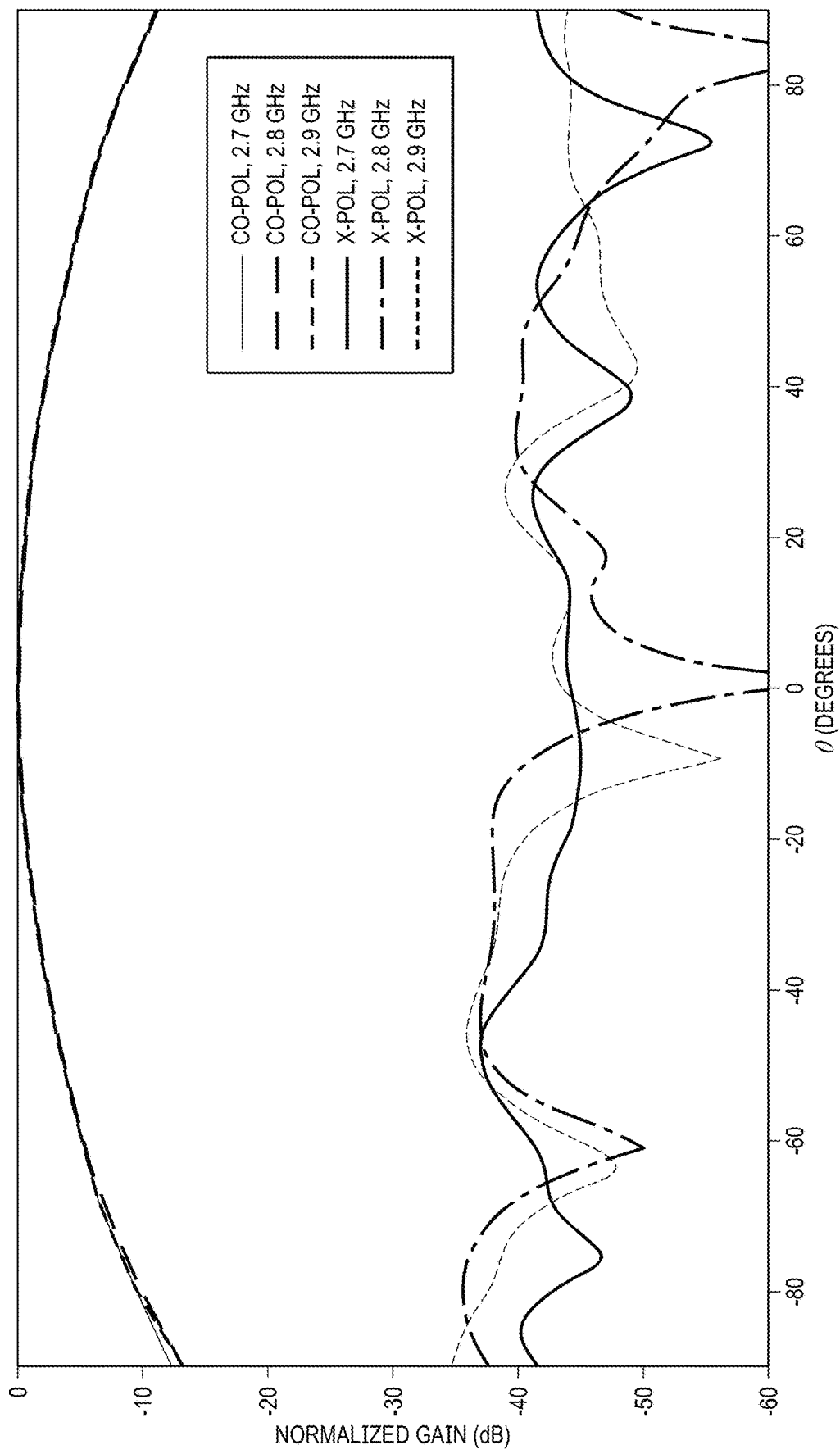
FIG. 6A shows the measured radiation pattern for $\varphi=0°$ plane and H-pol.
Figure 6B:
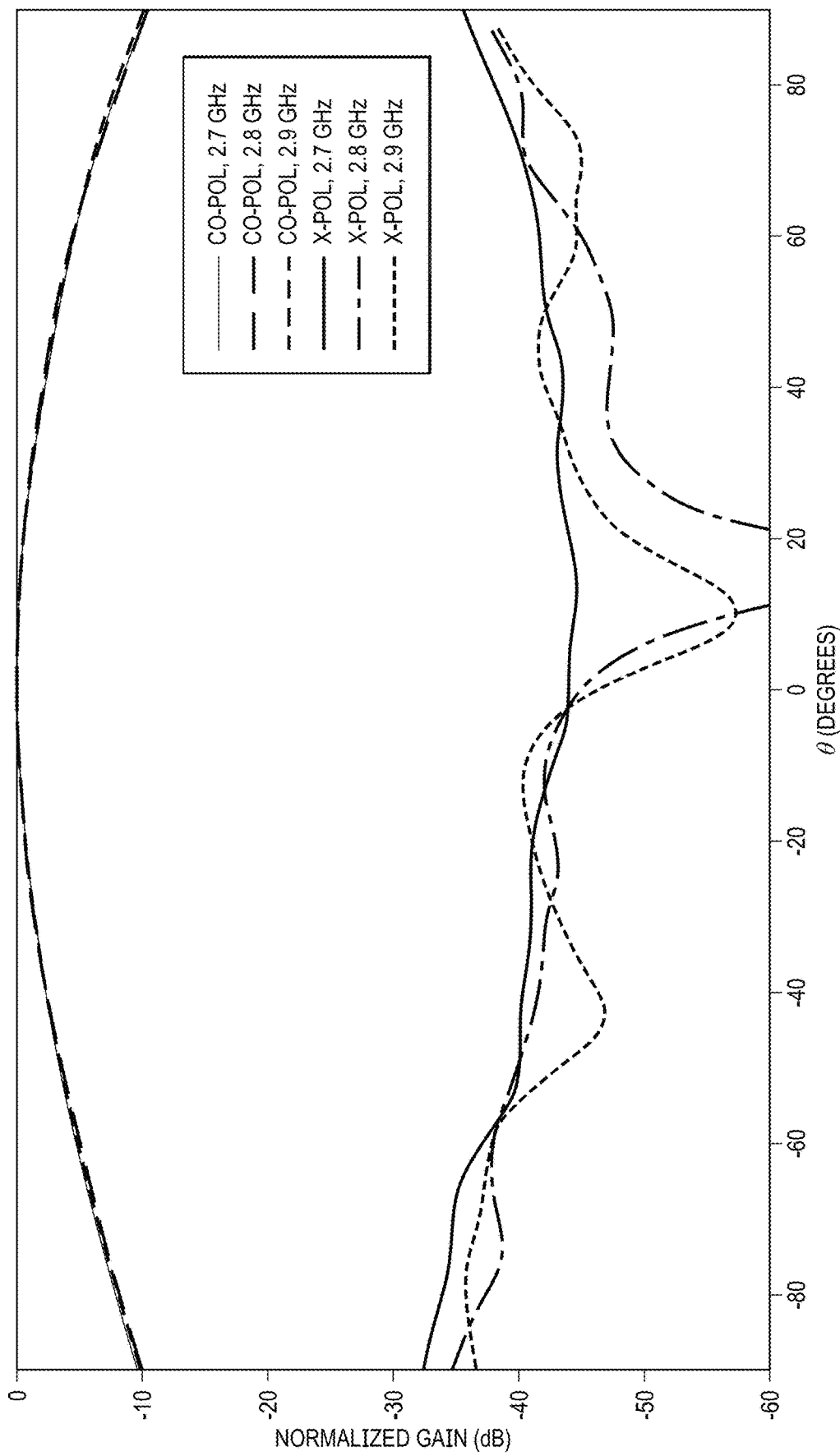
FIG. 6B shows the measured radiation pattern for $\varphi=90°$ plane and H-pol.
Figure 6C:
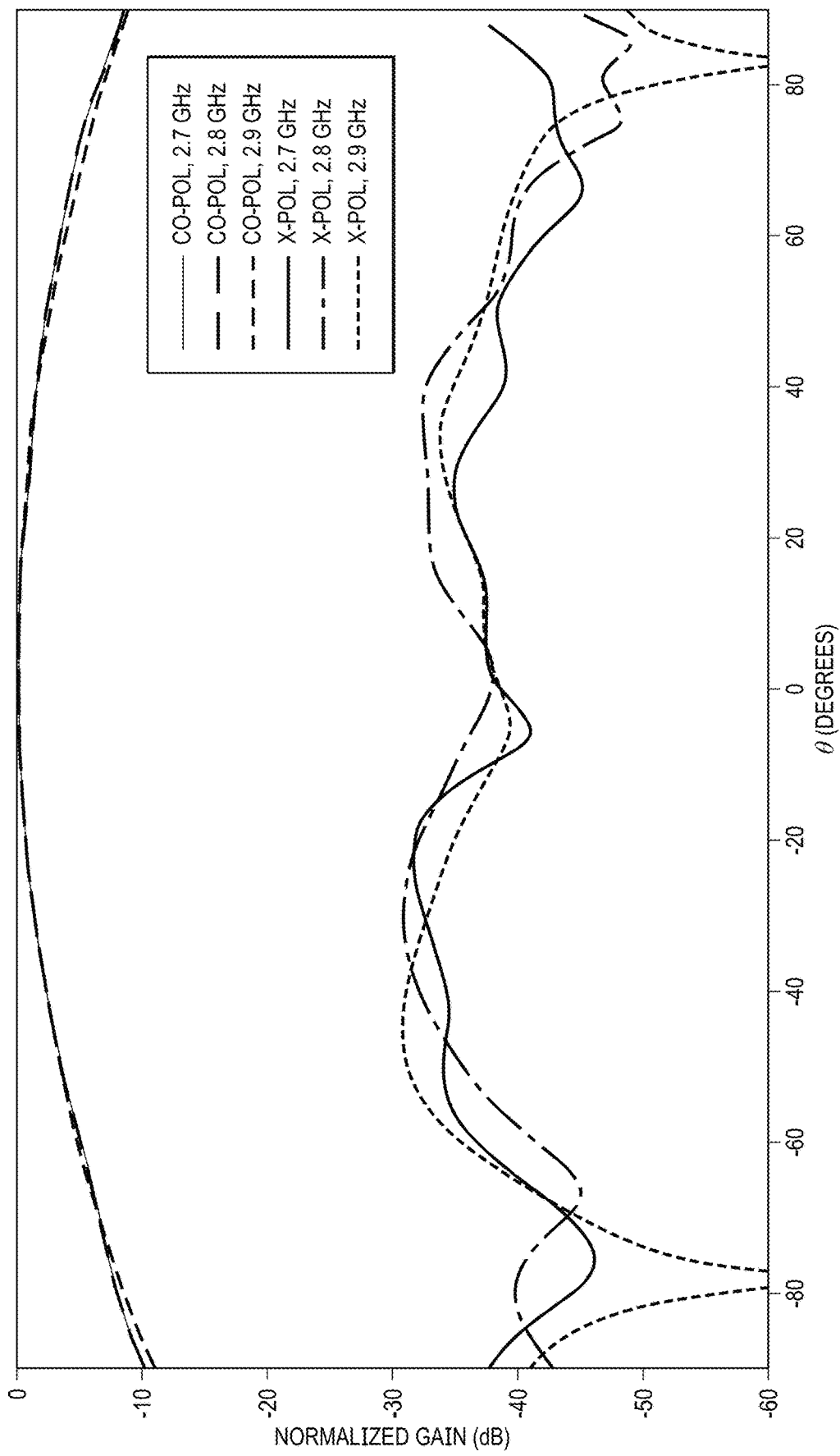
FIG. 6C shows the measured radiation pattern for $\varphi=0°$ plane and V-pol.
Figure 6D:
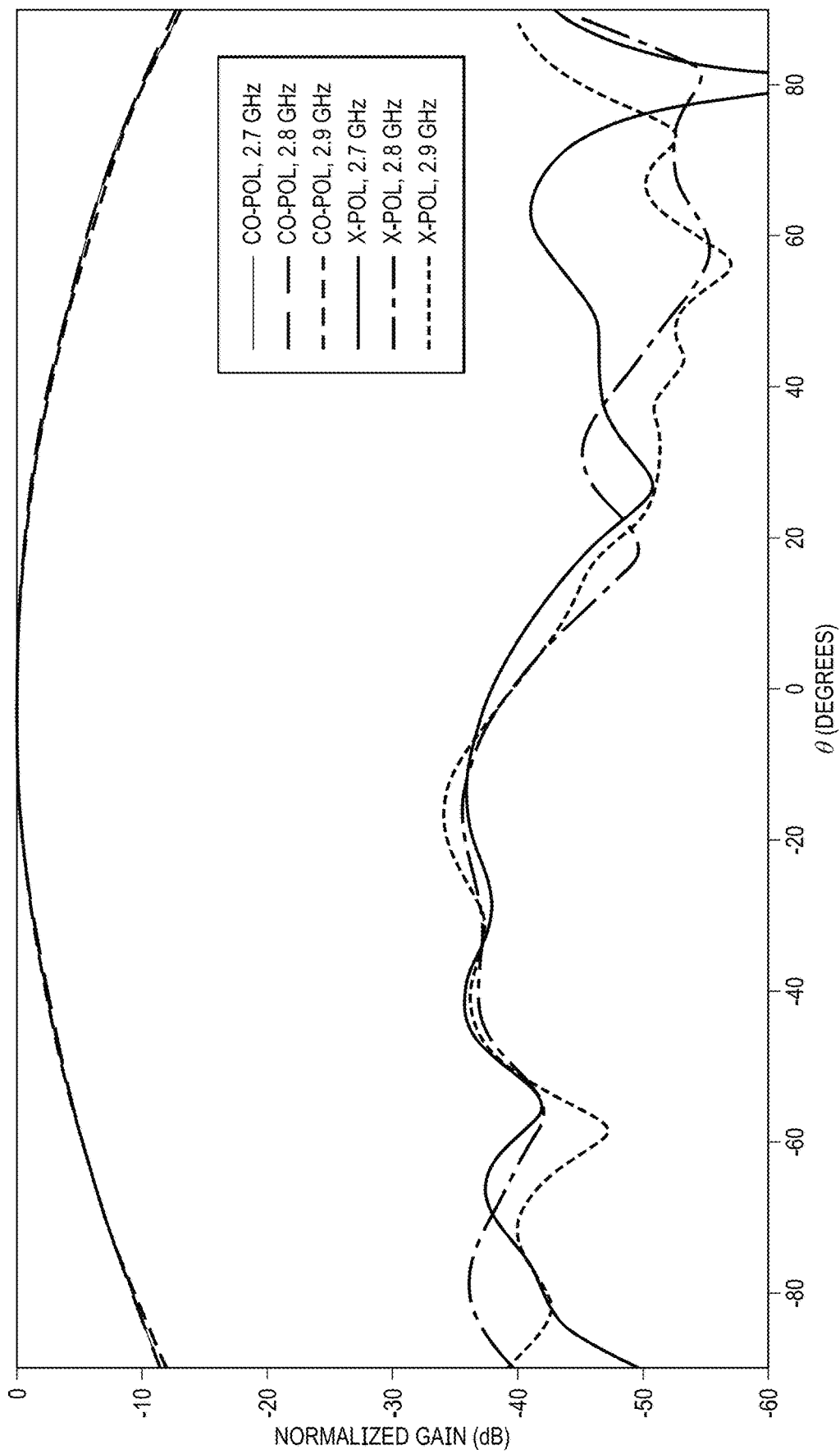
FIG. 6D shows the measured radiation pattern for $\varphi=90°$ plane and V-pol.

The measured radiation pattern of the fabricated hybrid feed patch antenna is provided in FIGS. 6A-6D. The measured cross-polarization patterns of horizontal polarization in principle planes are presented in FIG. 6A and FIG. 6B. For the horizontal polarization, the single element cross-polarization level at 2.8 GHz is below −36 dB in $\varphi=0°$ plane and better than −35 dB in $\varphi=90°$ plane. As seen in FIG. 6C and FIG. 6D, the measured cross-polarization level while vertical polarization is excited at 2.8 GHz is better than −30 dB in $\varphi=0°$ plane and less than −36 dB in $\varphi=90°$ plane. Although this level of cross-polarization is very low, to satisfy MPAR requirements, polarization purity of higher than 40 dB is required.

Example 2: Cross-Polarization Suppression and Subarray Design

Figure 7:
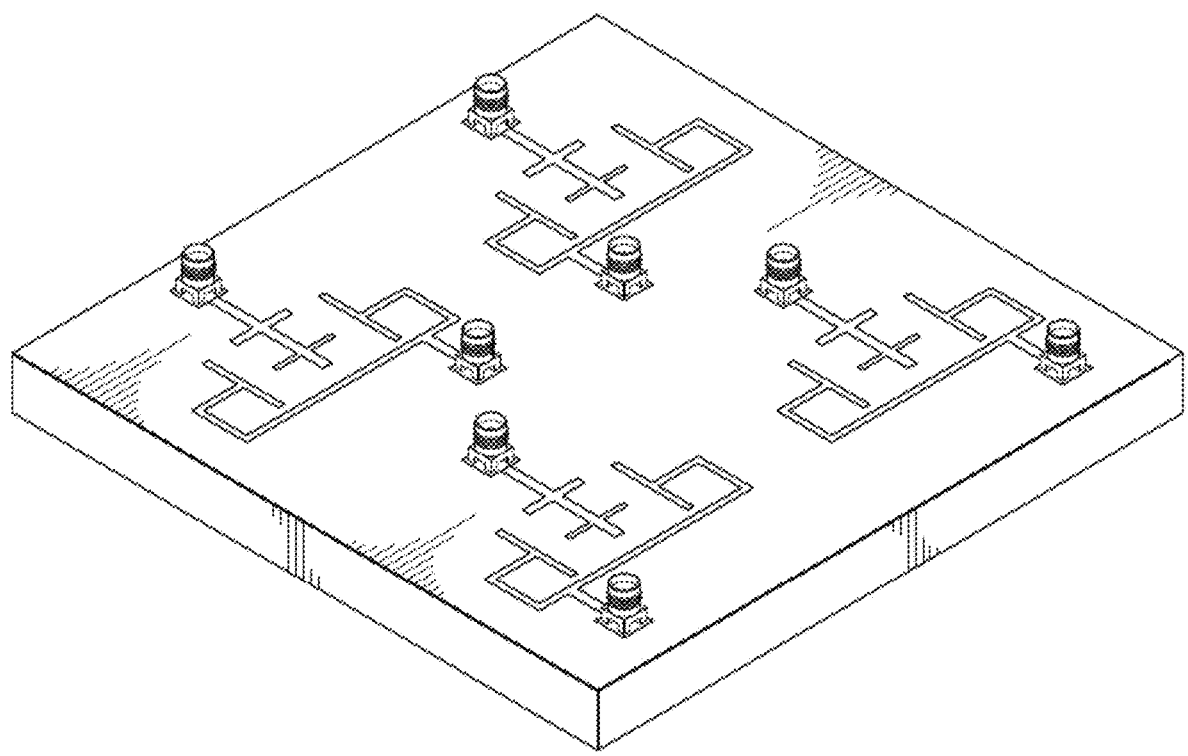
FIG. 7 is a photograph showing a 2×2 element subarray using the antennas of the present disclosure.
Figure 8A:
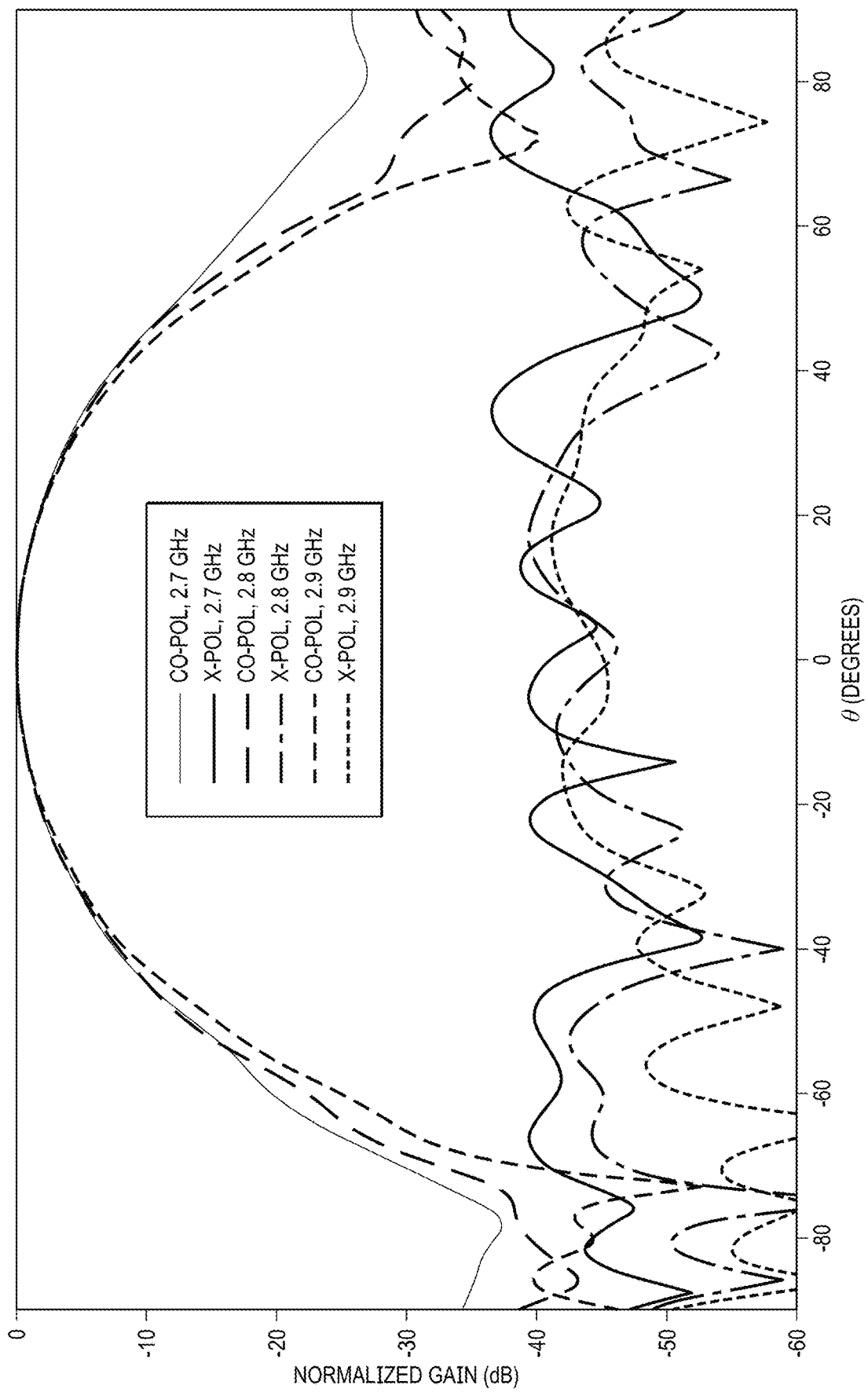
FIG. 8A shows the measured radiation pattern for $\varphi=0°$ plane and H-pol.
Figure 8B:
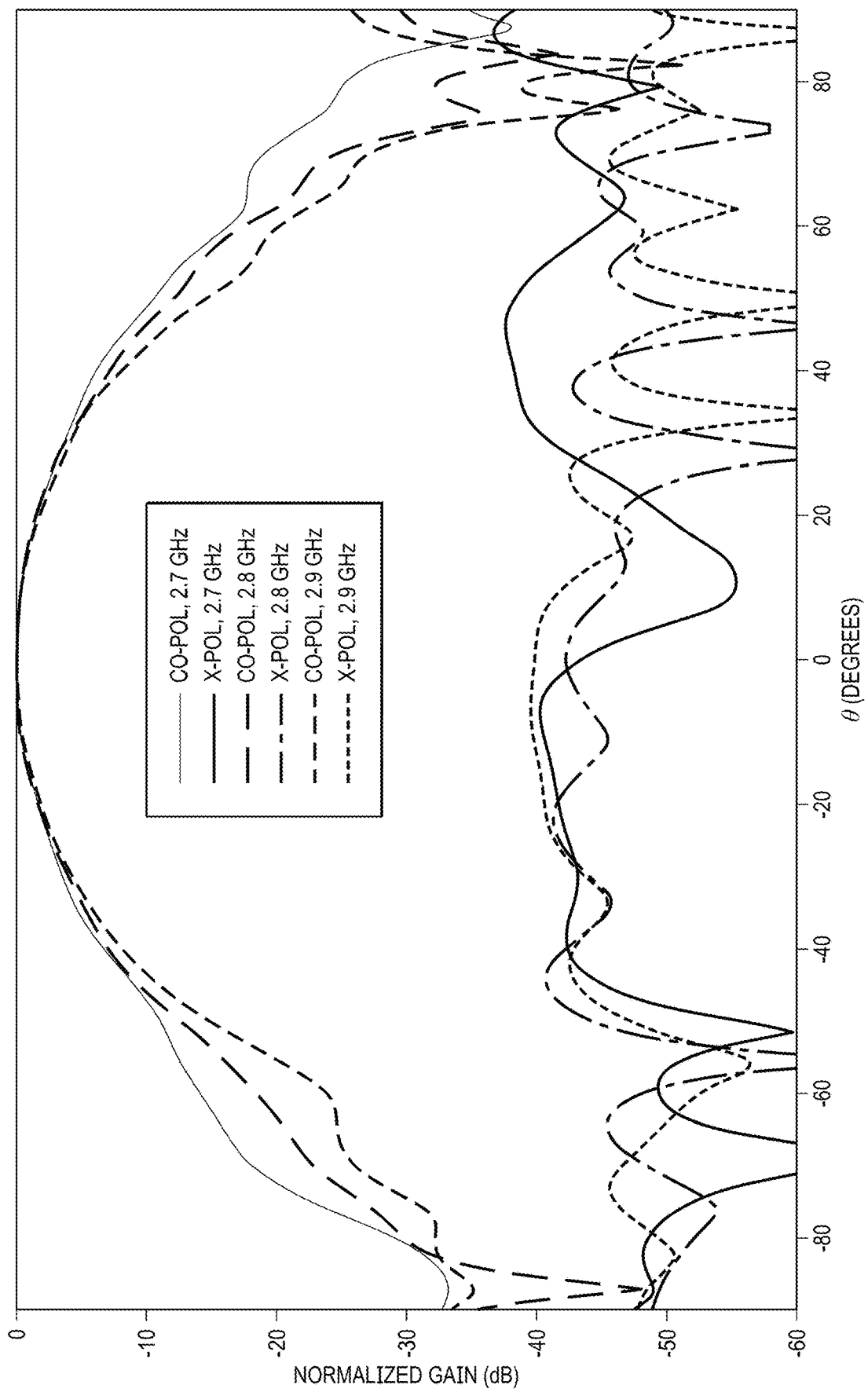
FIG. 8B shows the measured radiation pattern for $\varphi=90°$ plane and H-pol.
Figure 8C:
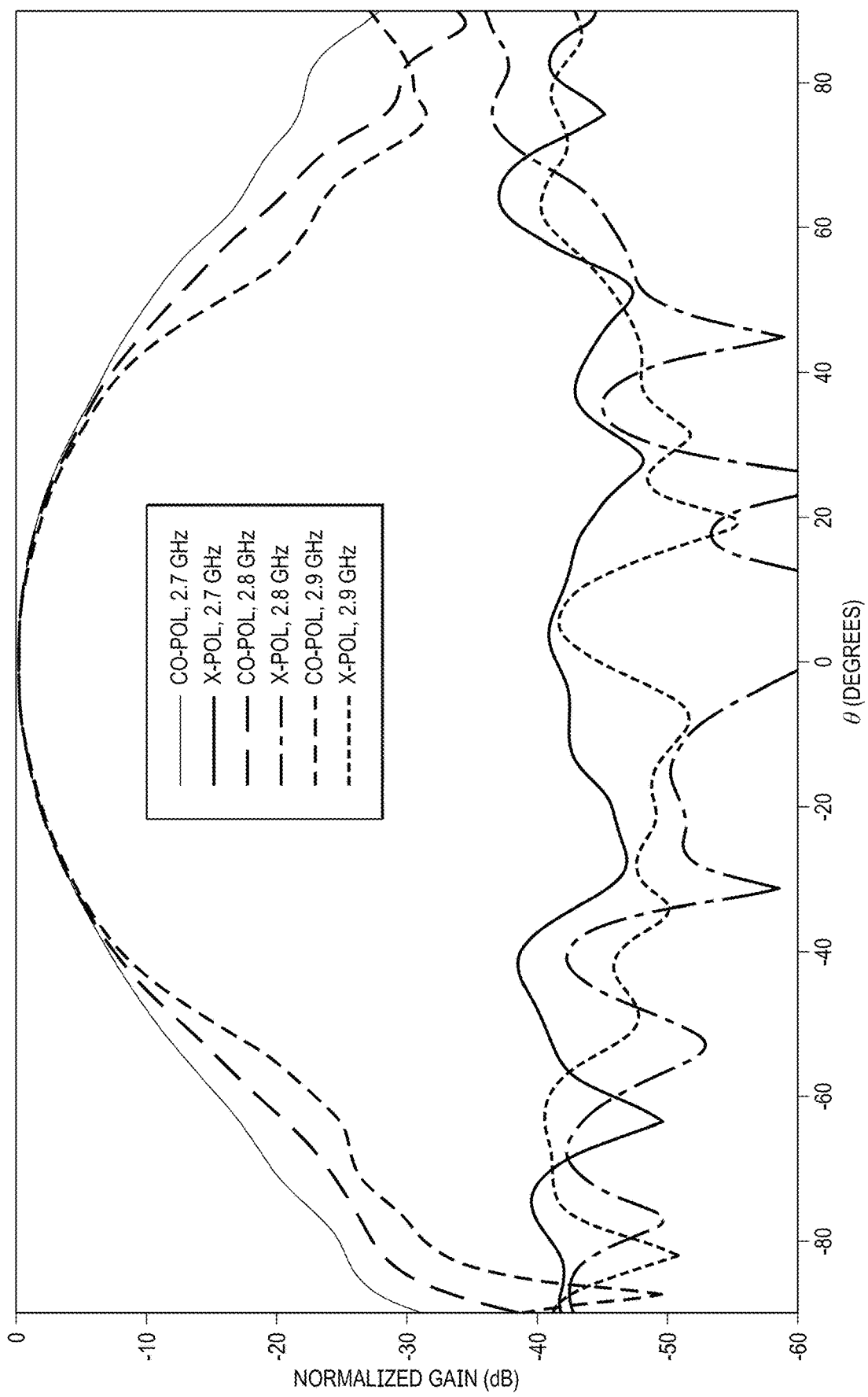
FIG. 8C shows the measured radiation pattern for $\varphi=0°$ plane and V-pol.
Figure 8D:
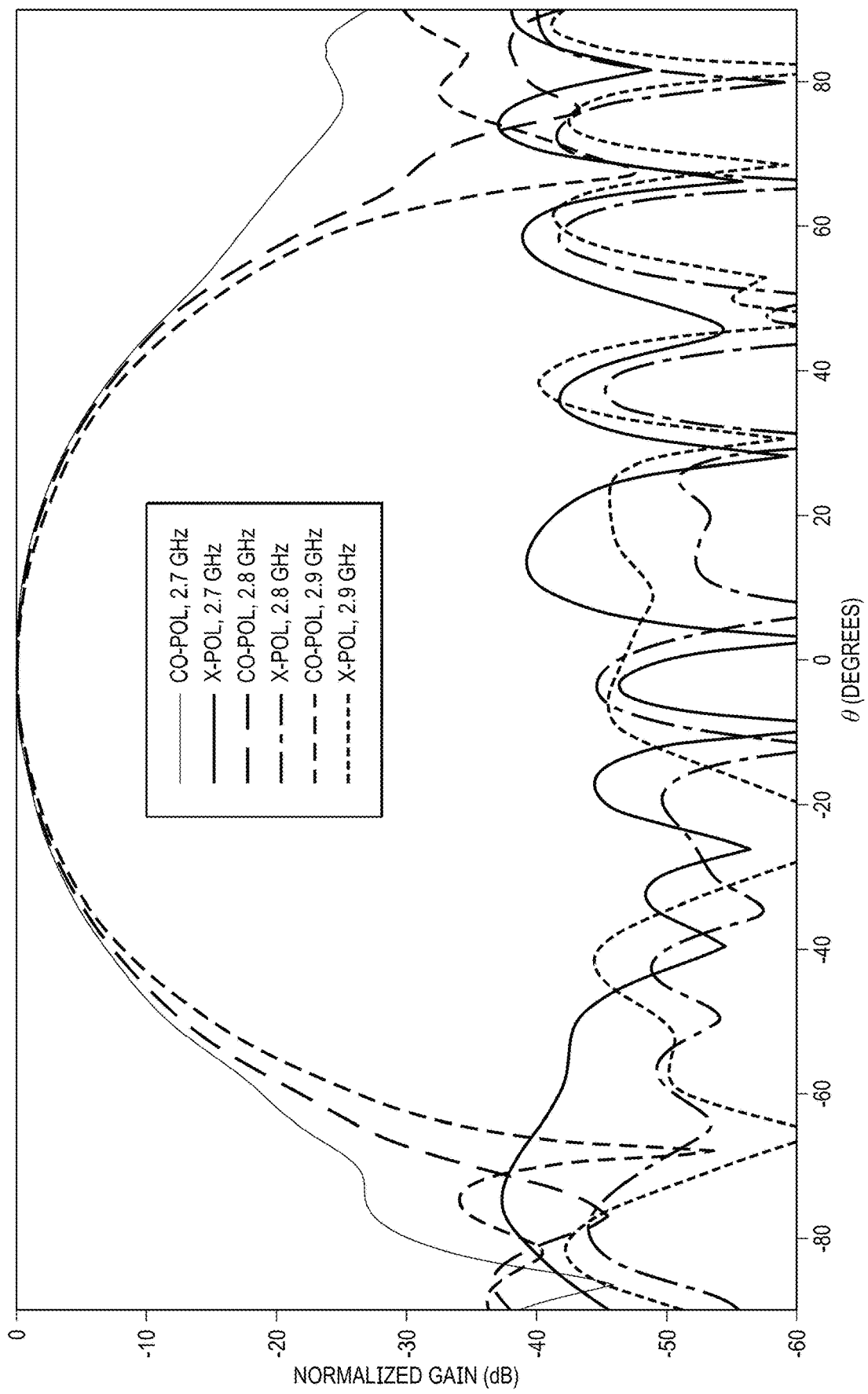
FIG. 8D shows the measured radiation pattern for $\varphi=90°$ plane and V-pol.

A dual-polarized antenna requires two individual ports for exciting orthogonal polarizations, and the low cross-polarization level is desired. A differential feeding technique will suppress the higher-order modes and all cross-polarization components of the antenna radiation pattern. A microstrip patch antenna with dual polarization functionality is realized while each polarization is excited with two 180° out-phase ports, which is called an ideal differential feed patch antenna. The advantage of using the ideal differential feed patch antenna is its extremely low cross-polarization level, especially in the principal planes. However, an ideal differential feed requires external 180° phase shifters. In a phased array radar, the increased quantity of connectors, cables, and phase shifters would significantly increase fabrication costs. An alternative solution for reducing the cross-polarization level is to arrange the elements of the array into the groups of 2×2-element identical subarrays in which the horizontal polarization ports are mirrored. The present disclosure describes the method of improving the cross-polarization level. A photograph of the designed subarray configured according to the image configuration is shown in FIG. 7. Similar to an ideal differential feed antenna, a 180° phase difference is applied for exciting the mirrored ports.

One non-limiting embodiment utilizes an integrated balun to excite one polarization at two locations with a 180° phase shift. In this design, the signal at the end of the feeding lines of the balun will be 180° out of phase from each other. The length of the transmission lines is adjusted to provide a 180° phase difference. The required length between the two arms of the vertical polarization transmission line is calculated analytically and then optimized in Ansys HFSS. The two 180° out-of-phase signals at the end of the two ends of the balun will be coupled to the radiating square patch through two apertures. Having two 180° out-of-phase excitation sources for one polarization will suppress the higher-order modes and cross-polar components of the antenna radiation pattern.

Methods and Results

The subarray radiation pattern was measured in a far-field anechoic chamber. The subarray is made of a 2×2 element array of the antennas, while the vertical polarization is mirrored with respect to the horizontal plane.

Step 1: The center of the subarray has been precisely aligned with the standard measurement probe.

Step 2: To measure the subarray horizontal polarization radiation pattern, a 4-way power divider has been implemented to excite all four in-phase ports. The co-polarization and cross-polarization patterns have been measured by changing the polarization of the measurement probe. The radiation patterns of the subarray in $\varphi=0°$ and $\varphi=90°$ have been measured by rotating the subarray for 90°.

Step 3: To measure the subarray vertical polarization, three 2-way power splitters and phase shifters were used, and two mirrored ports were excited with a 180° phase shift with respect to the two other ports. The co-polarization and cross-polarization patterns have been measured by changing the polarization of the measurement probe. The radiation patterns of the subarray in $\varphi=0°$ and $\varphi=90°$ have been measured by rotating the subarray 90°.

The measured radiation patterns of the fabricated 2×2-element subarray of the designed unit cell in FIG. 7 are shown in FIGS. 8A-8D. According to the measurement results, for both polarizations in the E-plane and H-plane from 2.7 GHz to 2.9 GHz, the cross-polarization level is around −40 dB. At the center frequency, with H-pol excitation the cross-polarization level is better than −40 dB in $\varphi=0°$ and less than −41 dB in $\varphi=90°$ plane. For vertical polarization at 2.8 GHz, the maximum cross-polarization level is less −37 dB in $\varphi=0°$ planes and less than −41 dB in $\varphi=90°$ plane. Also, the simulated cross-polarization level for both principal planes is better than −51 dB. The discrepancy between simulated and measured cross-polarization level is the result of unideal measurement environments such as cross-polarization of the transmitting antenna and backscattering of the antenna cable and positioner and possible fabrication errors.

Example 3: Array Design

Figure 9A:
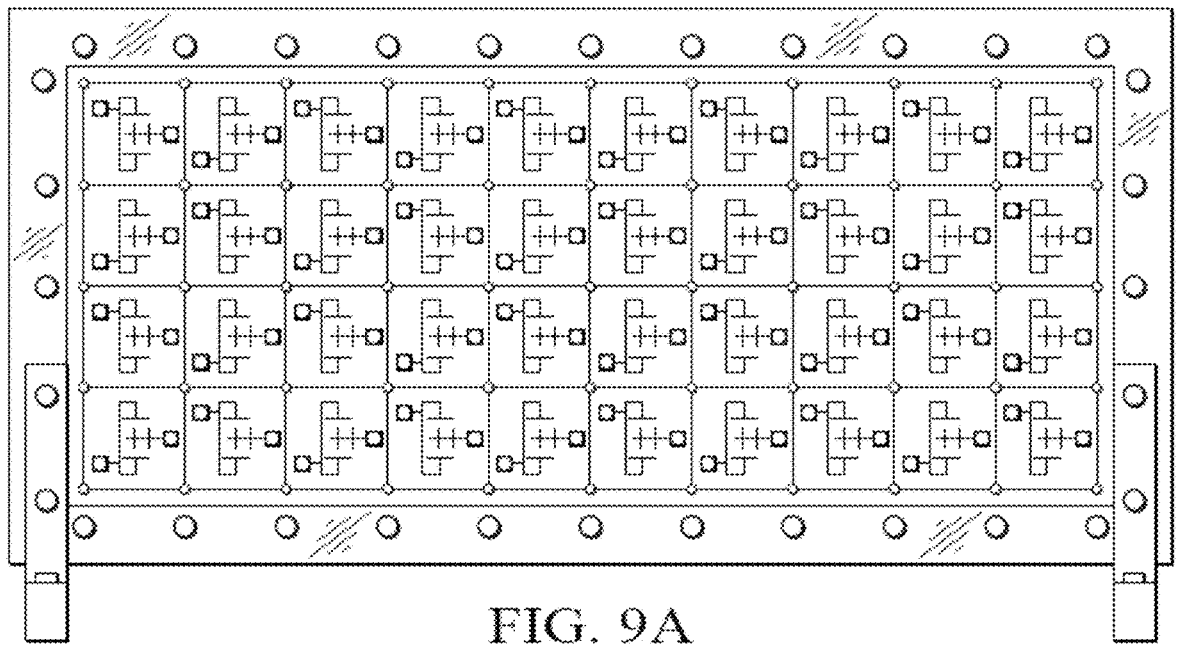
FIG. 9A shows the array with a $\varphi=0°$ plane.
Figure 9B:
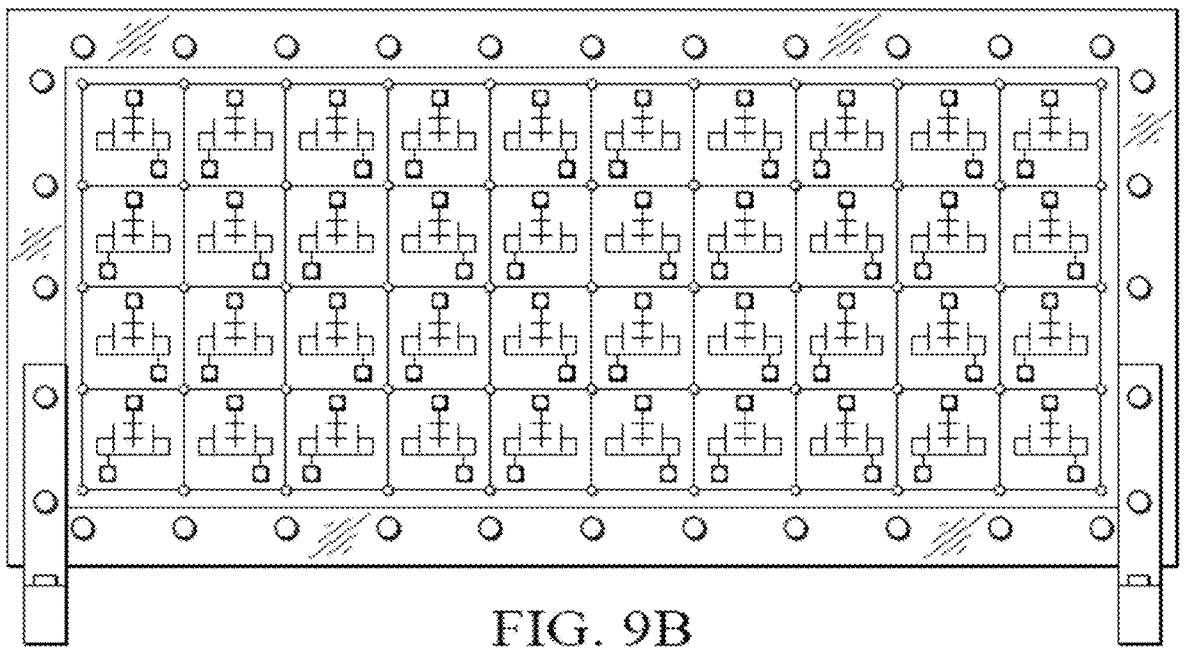
FIG. 9B shows the array with a $\varphi=90°$ plane.

To characterize the scan radiation pattern of the unit cell and subarray, a 2×5-element array of the presented subarray is fabricated. The geometry of the fabricated 4×10-element array, which is made for characterizing the scan characteristics of the unit cell at different scan angles in the $\varphi=0°$ plane, is shown in FIG. 9A. For measuring low cross-polarization levels, the alignment of the AUT with a transmitter antenna plays a key role. Considering perfect conditions in the anechoic chamber, any misalignment between the AUT and transmitter antenna results in measuring the cross-polarization level in off-principle planes. For a perfect alignment between the AUT and the transmitter antenna, the antennas are installed on the fixture, which is fabricated from plexiglass. These plexiglass components of the antenna fixture are precisely processed by a laser cutting machine. The two white components of this fixture are made from ABS by using a 3D printer. As seen in FIG. 9B, to characterize the array scanning performance in $\varphi=90°$ plane, the 2×2-element subarrays are rotated 90°.

Although a 4×10-element array antenna is fabricated for characterizing the performance of the designed single element, for MPAR applications, final array dimensions may be as large as a cylindrical array antenna with a 10 m diameter. Therefore, to decrease the edge element's effect on the array radiation characteristics, one element from each side is terminated. The simulated realized gain of the proposed unit cell at 2.8 GHz is 6.7 dB and 6.8 dB with the H-pol and V-pol excitations, respectively. With the 2×8-element array configuration, the simulated realized gain increases to 17.26 dB and 16.88 dB for horizontal and vertical polarizations, respectively.

Methods and Results

The array antenna radiation patterns are measured according to the UEAEP method.

Step 1: Every element pattern is measured separately, while all other remaining elements were terminated.

Step 2: Measure the co-polarization and cross polarization radiation pattern in $\varphi=0°$ and $\varphi=90°$ planes.

Step 3: The magnitude and phase of all the measured active element patterns are imported into MATLAB.

Step 4: The required phase shift between elements to steer the array radiation pattern is calculated and applied to the measured radiation pattern. The active reflection coefficient magnitude of the entirely excited antenna array at the steering angles is contributing to the measured realized gain while measuring the active element pattern. Therefore, using the UEAEP method for characterizing the array scan radiation pattern decreases the cost and risk of failure in the measurements of the prototypes.

Figure 10B:
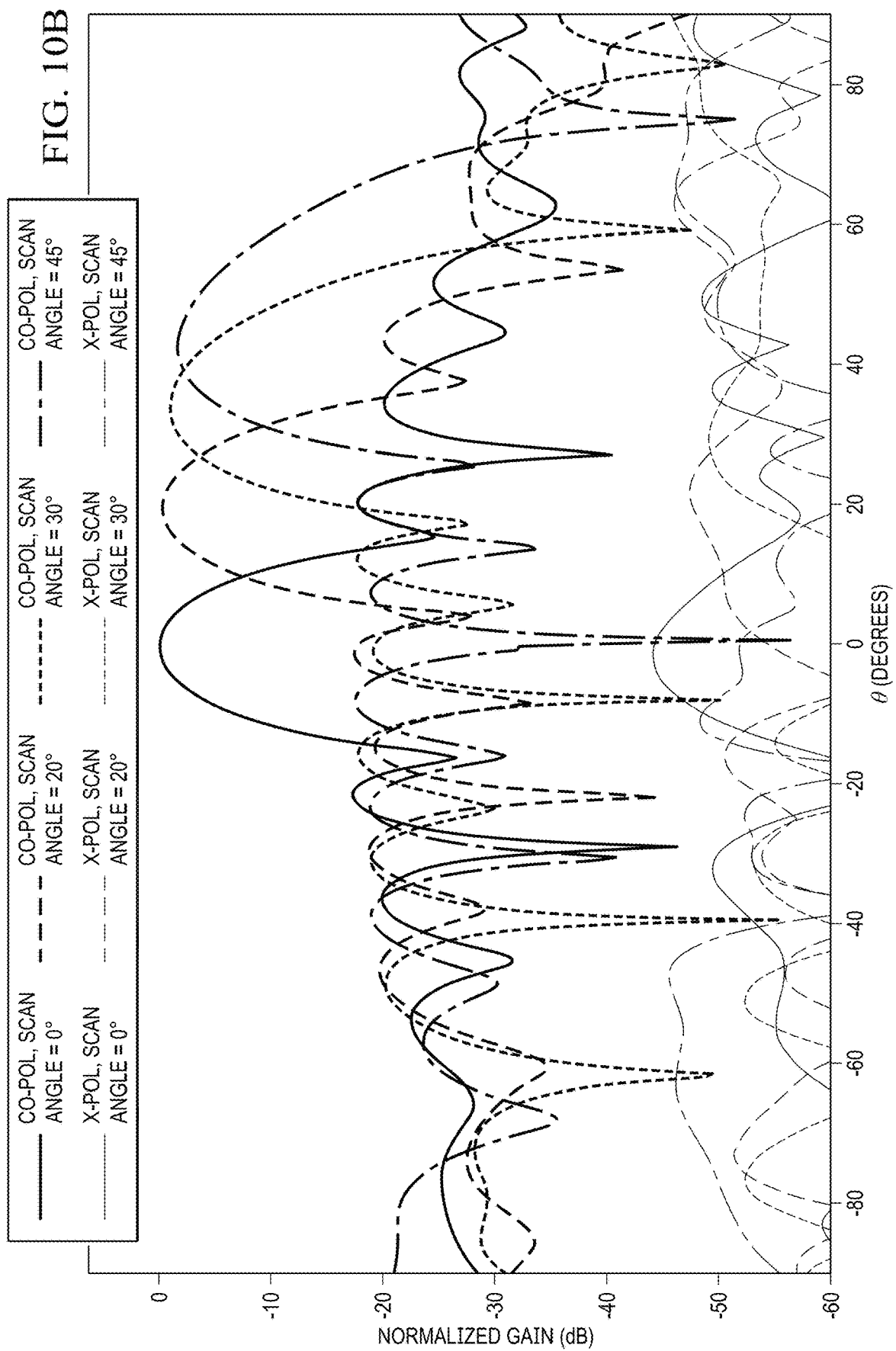
FIG. 10B shows the measured scan radiation pattern for H-pol and $\varphi=90°$.
Figure 11A:
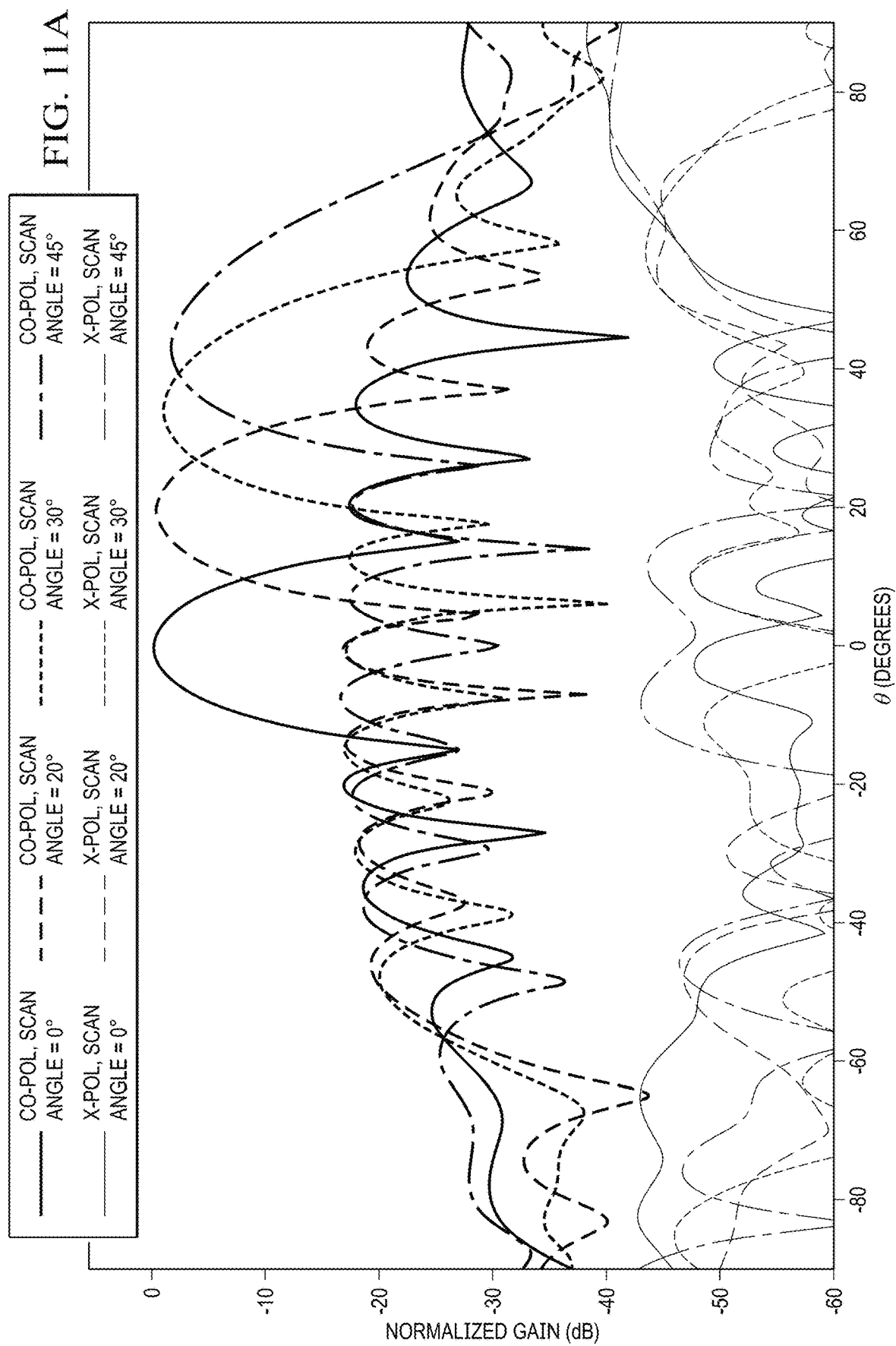
FIG. 11A shows the measured scan radiation pattern for V-pol and $\varphi=0°$.
Figure 11B:
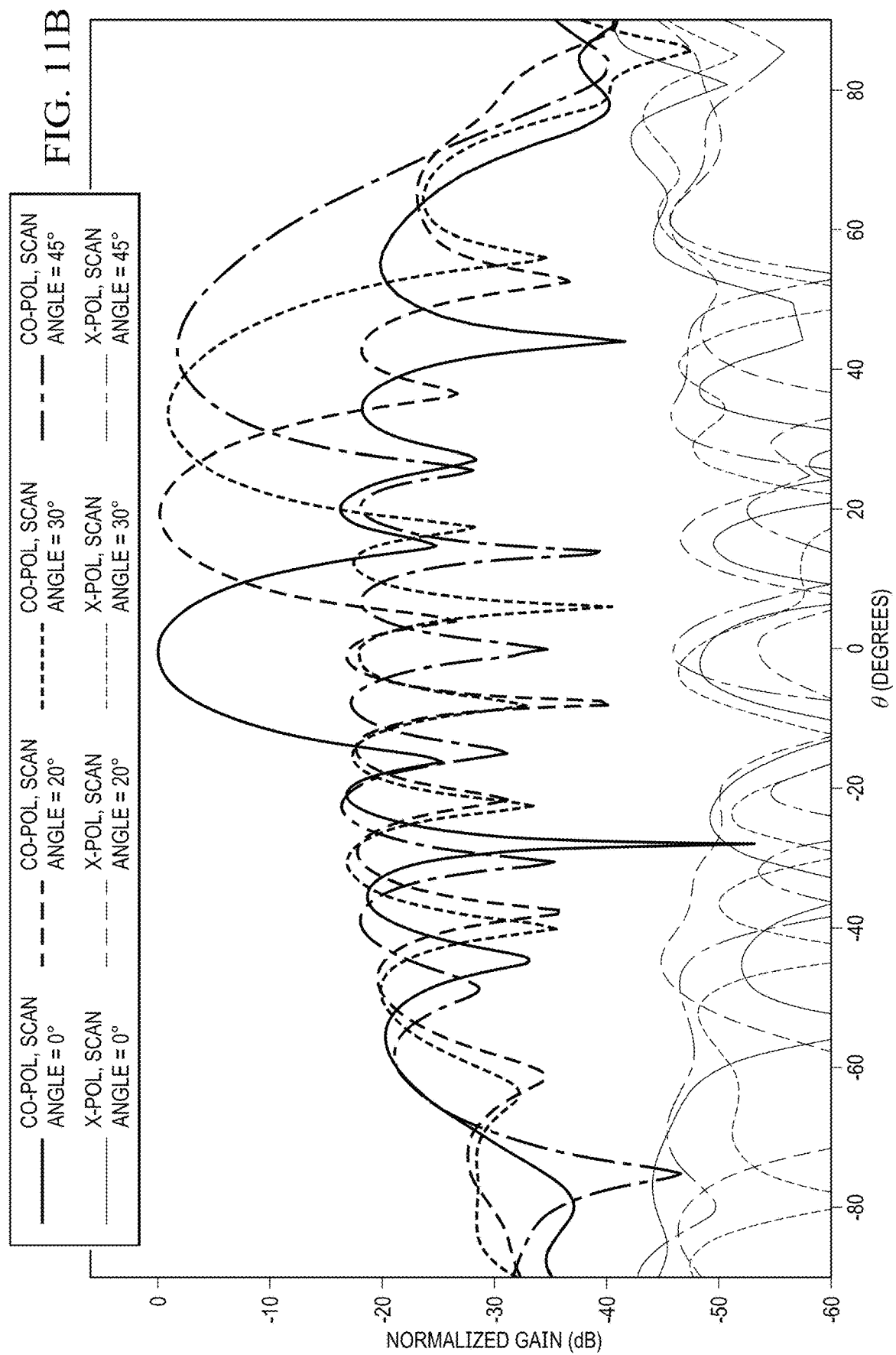
FIG. 11B shows the measured scan radiation pattern for V-pol and $\varphi=90°$.

Following the UEAEP method, the array antenna measured scan pattern in principle planes at the MPAR operating frequency are shown in FIGS. 10A-10B and FIGS. 11A-11B. FIGS. 10A-10B show measured scan radiation patterns of the central 2×8-element array in the 4×10-element array of FIGS. 9A-9B at 2.7 GHz, 2.8 GHz, and 2.9 GHz. FIGS. 11A-11B show measured scan radiation patterns of the central 2×8-element array in the 4×10-element array of FIGS. 9A-9B at 2.7 GHz, 2.8 GHz, and 2.9 GHz. Also, the array element's excitation amplitude is adjusted according to 25 dB Taylor amplitude tapering to decrease the sidelobe level. With the H-pol excitation, the array cross-polarization level while scanning up 45° remains less than −40 dB in the φ=0° plane. Also, the cross-polarization level of less than −44 dB is achieved in the φ=90° plane with the H-pol excitation. It is seen that the cross-polarization levels of V-pol excitation are better than −40 dB in the φ=0° plane and −39 dB in the φ=90° plane with scanning up to 45°. The reported cross-polarization values are the peak of the cross-polarization at 2.8 GHz from −90°<θ<90°. For the scanning up to 20°, which is the maximum required beam steering for cylindrical geometry, the cross-polarization levels in the main beam area are mostly below −45 dB. This level of the cross-polarization pattern could satisfy the MPAR requirements.

While the present disclosure has been described in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure. Thus the examples described above, which include particular embodiments, will serve to illustrate the practice of the present disclosure, it being understood that the particulars shown are by way of example and for purposes of illustrative discussion of particular embodiments only and are presented in the cause of providing what is believed to be the most useful and readily understood description of procedures as well as of the principles and conceptual aspects of the presently disclosed methods and compositions. Changes may be made in the structures of the various components described herein, or the methods described herein without departing from the spirit and scope of the present disclosure.

What is claimed is:

1. A microstrip patch antenna comprising:
   a unit cell comprising:
      a plurality of layers comprising:
         a first laminate comprising one or more horizontal polarization feed lines and one or more vertical polarization feed lines,
         a second laminate comprising a radiating square patch, and
         a third laminate comprising a parasitic patch; and
      a ground plane positioned between the first laminate and the third laminate and comprising one or more polarization slots.

2. The microstrip patch antenna of claim 1, wherein the plurality of layers further comprises an adhesive material positioned between the first laminate and the second laminate and between the second laminate and the third laminate.

3. The microstrip patch antenna of claim 1, wherein the parasitic patch is positioned adjacent to the radiating square patch.

4. The microstrip patch antenna of claim 1, wherein the plurality of layers further comprises metalized apertures.

5. The microstrip patch antenna of claim 1, wherein the one or more polarization slots comprise a horizontal polarization slot positioned symmetrically with respect to a horizontal plane and a vertical plane.

6. The microstrip patch antenna of claim 5, wherein the horizontal polarization slot is positioned in a middle of the ground plane.

7. The microstrip patch antenna of claim 1, further comprising one or more horizontal polarization ports, wherein the one or more horizontal polarization ports are offset.

8. The microstrip patch antenna of claim 7, further comprising one or more vertical polarization ports orthogonal to the one or more horizontal polarization ports.

9. The microstrip patch antenna of claim 1, wherein the one or more horizontal polarization feed lines are mirrored.

10. A microstrip patch antenna subarray comprising:
    a plurality of unit cells, each comprising:
       a first laminate comprising one or more horizontal polarization feed lines and one or more vertical polarization feed lines,
       a second laminate comprising a radiating square patch,
       a third laminate comprising a parasitic patch, and
       a ground plane positioned between the first laminate and the third laminate and comprising one or more polarization slots.

11. The microstrip patch antenna subarray of claim 10, further comprising:
    one or more horizontal polarization ports offset from each other; and
    one or more vertical polarization ports orthogonal to the one or more horizontal polarization ports.

12. The microstrip patch antenna subarray of claim 10, wherein the one or more horizontal polarization feed lines are mirrored.

13. The microstrip patch antenna subarray of claim 10, wherein each of the plurality of unit cells further comprises an adhesive material positioned between the first laminate and the second laminate and between the second laminate and the third laminate.

14. The microstrip patch antenna subarray of claim 10, wherein the parasitic patch is positioned adjacent to the radiating square patch.

15. The microstrip patch antenna subarray of claim 10, wherein each of the plurality of unit cells further comprises metalized apertures.

16. The microstrip patch antenna subarray of claim 10, wherein the one or more polarization slots comprise a horizontal polarization slot positioned symmetrically with respect to a horizontal plane and a vertical plane.

17. An antenna array comprising:
    a plurality of microstrip patch antennas, wherein each of the microstrip patch antennas comprises a unit cell, wherein the unit cell comprises:
       a plurality of layers comprising:
          a first laminate comprising one or more horizontal polarization feed lines and one or more vertical polarization feed lines,
          a second laminate comprising a radiating square patch, and
          a third laminate comprising a parasitic patch; and
       a ground plane positioned between the first laminate and the third laminate and comprising one or more polarization slots.

18. The antenna array of claim 17, wherein the plurality of layers further comprises an adhesive material positioned between the first laminate and the second laminate and between the second laminate and the third laminate.

19. The antenna array of claim 17, wherein the parasitic patch is positioned adjacent to the radiating square patch.

20. The antenna array of claim 17, wherein the plurality of layers further comprises metalized apertures.

21. The microstrip patch antenna subarray of claim 10, further comprising four elements, wherein the four elements comprise horizontal polarization ports that are positionally mirrored and comprise a 180 degree (°) phase shift with respect to each other.

22. The microstrip patch antenna of claim 1, wherein the one or more polarization slots comprise three horizontal polarization slots that are H-shaped and independent of each other.

\* \* \* \* \*